(12) United States Patent
Mueller et al.

(10) Patent No.: US 7,735,338 B2
(45) Date of Patent: Jun. 15, 2010

(54) METHOD AND DEVICE FOR PRODUCING THIN GLASS PANES

(75) Inventors: Rudolf Mueller, Bingen (DE); Horst Loch, Niedernhausen (DE); Dirk Sprenger, Stadecken-Elsheim (DE); Jose Zimmer, Lasheim am See (DE); Holger Wegener, Alfeld (DE)

(73) Assignee: Schott AG, Mainz (DE)

( * ) Notice: Subject to any disclaimer, the term of this patent is extended or adjusted under 35 U.S.C. 154(b) by 484 days.

(21) Appl. No.: 11/867,424

(22) Filed: Oct. 4, 2007

(65) Prior Publication Data
US 2008/0184741 A1 Aug. 7, 2008

Related U.S. Application Data

(63) Continuation of application No. 10/451,559, filed on Nov. 14, 2003, now abandoned.

(30) Foreign Application Priority Data

Dec. 23, 2000 (DE) ................. 100 64 977

(51) Int. Cl.
*C03B 18/02* (2006.01)
(52) U.S. Cl. .......... 65/29.14; 65/29.21; 65/90; 65/128; 65/184; 65/186; 65/327
(58) Field of Classification Search .......... 65/29.14, 65/29.17, 29.21, 90, 126, 128, 129, 184, 65/186, 327
See application file for complete search history.

(56) References Cited

U.S. PATENT DOCUMENTS

| 1,673,907 | A | * | 6/1928 | Ferngren | 65/53 |
| 1,697,227 | A | * | 1/1929 | Danner | 65/53 |
| 2,926,208 | A | * | 2/1960 | Eden | 373/33 |
| 3,275,429 | A | * | 9/1966 | Javaux | 65/185 |
| 3,410,675 | A | * | 11/1968 | Dockerty | 65/129 |
| 6,417,124 | B1 | * | 7/2002 | Peuchert et al. | 501/66 |

FOREIGN PATENT DOCUMENTS

JP    02217327 A  *  8/1990

* cited by examiner

*Primary Examiner*—Steven P Griffin
*Assistant Examiner*—Queenie Dehghan
(74) *Attorney, Agent, or Firm*—Michael J. Striker

(57) ABSTRACT

The method of making thin glass panes includes conveying a glass melt through a vertical inlet to a drawing tank with a slit nozzle; drawing a glass ribbon downward from the slit nozzle; setting a total throughput by setting length and cross section of the inlet and by heating and cooling the inlet to control glass melt viscosity so that pressure in the inlet decreases; and setting a throughput per unit of length in a lateral direction along the glass ribbon via nozzle system geometry and by heating and cooling of the drawing tank and slit nozzle to control melt viscosity, so that glass does not wet an underside of the slit nozzle near a breaking edge. The setting of the total throughput and the throughput per unit length are largely decoupled to simplify process control. An inventive apparatus for performing the method is also disclosed.

32 Claims, 2 Drawing Sheets

METHOD AND DEVICE FOR PRODUCING THIN GLASS PANES

CROSS-REFERENCE

This is a continuation of U.S. patent application Ser. No. 10/451,559 filed Nov. 14, 2003 now abandoned, which is the U.S. National Stage of PCT/EP 01/15654, filed on Dec. 13, 2001, in Europe, which claims the priority of German Patent Application 100 64 977.7, filed on Dec. 23, 2000, in Germany, under 35 U.S.C. 119 (a) to (d) and 35 U.S.C. 365 (b).

BACKGROUND OF THE INVENTION

The invention relates to a method for producing glass panes, in particular glass panes with a thickness of less than 3 mm, by drawing a thin glass ribbon vertically downward, in which a glass melt is conveyed from a tank furnace, through an inlet, and to a drawing tank with a nozzle system that has at least one debiteuse. The invention also relates to a device comprising a tank furnace, a homogenization system, an inlet and a drawing tank, wherein the drawing tank has a nozzle system having at least one slit nozzle.

Thin glass panes of this kind are used as substrate glass in electronic devices, for example displays (portable telephones, flat screens, etc.) and digital mass storage devices of computers. Therefore extremely high demands are placed on the internal quality of the glass that is essentially determined by bubbles and inclusions, on the cleanness, on the quality of the surface geometry that is essentially determined by the fine corrugations (waviness) and by deviations from flatness (warp), on the breaking strength, and possibly also on the low weight.

When the glasses are used as substrate glass for displays, clients subject them to thermal manufacturing processes at temperatures that approach the transition temperature of glass. The dimensional stability of the glass substrates must be maintained in the course of this. Therefore special glasses or even glass ceramics with increased glass transition temperatures are used as substrate glasses, most of which have an increased tendency to crystallize and an atypical viscosity curve as a function of the temperature. These glasses consequently require higher processing temperatures than standard glasses.

Since these applications are mass produced products, it is necessary to manufacture the glass panes as inexpensively as possible. It is thus desirable to achieve a high degree of process stability with short set-up times and down times, with high throughputs and low waste, which are caused by glass defects and in the border region. In addition, it is necessary to largely fulfill the client requirements with regard to the cleanness of the surface and the quality of the surface geometry, thus allowing the high-cost processing steps of finishing work, e.g. grinding and polishing, to be reduced or eliminated.

In the drawing methods that have been known up to this point, the above-mentioned requirements with regard to the product quality and economy are only partially fulfilled.

Among the manufacturing methods, a distinction is drawn between drawing methods with and without a debiteuse.

In the drawing method without a debiteuse, which is described for example in U.S. Pat. No. 3,338,696, a trough is used into which the glass melt is conveyed. The glass melt runs over the upper edge of the trough walls and travels downward along the outsides of the wedge-shaped trough. At the vertex point, the glass films thus produced flow together and are drawn downward. The ceramic trough is clad with platinum to reduce corrosion.

In this method, the total throughput is essentially determined by the inlet between the tank furnace and the trough. The so-called linear throughput, which is understood to be the throughput per unit of length lateral to the drawing direction of the glass ribbon, is adjusted by means of the glass flow in the trough, the glass level in the vicinity of the overflow lip of the trough, the geometry of the overflow lip, and the viscosity of the glass. A very exact temperature regulation is required, which must be to within 0.1° C.

Format or throughput changes require the geometry of the drawing trough to be adapted, in particular for the glass flow in the trough. Since it takes up to a week or more to start up a new drawing trough, the desired flexibility of production is only achieved to a limited degree.

The corrosion of the trough edges cannot be compensated for by tilting or stretching the trough. The trough must be replaced and the process must then be started up again.

In order to produce a wide glass ribbon with narrow borders, the glass ribbon must be stretched lateral to the ribbon direction, by means of so-called border rollers in the edge region. The border rollers increase the complexity of the manufacturing process.

Among the drawing methods with a slit nozzle, a distinction is drawn between those with and without draw bars or spreaders.

In the method with a slit nozzle, but without a draw bar described for example in SU 617,390, the glass from the refiner or conditioner runs over the opposing walls on both sides of an overflow weir made of a fireproof material. The two glass films thus produced flow together above a nozzle and are then drawn downward. The throughput is regulated by means of the glass level at the overflow lips. This can occur either by changing the glass level in the refiner or by more deeply immersing the overflow block.

The method with a slit nozzle but without a draw bar cannot fulfill the increased demands for surface quality, in particular with regard to fine corrugations (waviness). Because of the short dwell time of the glass in the onion region and because of the high viscosity of the glass, the irregularities do not heal.

It is also impermissible to exceed certain processing temperatures due to the increased instabilities in the onion region when the glass melt falls below critical viscosities. Consequently, the known drawing methods without a draw bar cannot be used to produce special glasses with an increased tendency to crystallize.

The disadvantages described above are partially avoided through the use of a slit nozzle with an internal draw bar.

U.S. Pat. No. 1,759,229 describes a drawing method for producing flat glass, in which glass flows through a slit nozzle that is provided in the bottom of a refiner or conditioner, onto a spreader with a rhomboid cross section, and is drawn downward over this spreader. Underneath the slit nozzle, the spreader is fitted into a recess that widens out toward the bottom. The glass bath depth of the refiner or conditioner increases toward the ends of the slit nozzle. Both the nozzle and the spreader can be contoured. It is essential here that the nozzle slit widens out toward the edges and that the alignable spreader that is used can be bowed upward in the middle.

The lower, wedge-shaped part of the spreader is provided with an enclosed region that can contain heating or cooling elements extending lateral to the drawing direction. The temperatures of the spreader can be adjusted by means of flows of temperature control mediums.

The glass flow is influenced by the geometry of the nozzle and spreader, by the temperature level and profile in the refiner or conditioner, and by the position of the spreader in relation to the nozzle. Among other tasks, the spreader must homogenize the temperatures of the glass lateral to the drawing direction so that flat glass is produced with the predetermined dimensions and a uniform appearance.

DE-AS 15 96 484 has disclosed a device, which includes a homogenizing receptacle that is connected to a drawing furnace by means of a closed, heatable channel. The drawing furnace is equipped with a nozzle, which is provided with a slit made of platinum at the bottom. Underneath the nozzle, a draw bar is provided in the form of a vertically situated plate. The glass melt emerging from the nozzle travels downward on both sides of the draw bar and comes together at the bottom end to form a glass ribbon.

For heat dissipation from the inside, bores are provided in the draw bar, through which coolant can be conveyed. In addition, cooling bodies are attached to the outside of the draw bar at the bottom. The height of the draw bar can be adjusted by means of adjusting screws.

JP 2-217,327 has disclosed a device for producing flat glass in which the glass is drawn downward through a slit that is provided in the bottom of a feeder or a refiner. The slit nozzle can be heated indirectly. The glass flow is shut off with the aid of a plunger disposed over the slit. In order to stabilize the glass ribbon, the debiteuse has a plate-shaped internal draw bar disposed in it, which is secured at the sides and can be adjusted in position, whose upper section protrudes into the debiteuse and whose lower part is encapsulated.

U.S. Pat. No. 1,829,639 describes a method and a device with which the total throughput and the linear throughput are adjusted only by means of the geometry of the nozzle system, the viscosity of the glass melt in the vicinity of the nozzle, and the pressure of the glass melt through the nozzle. Upon emerging from the nozzle, the glass melt has only a slight excess pressure due to the open storage system with a low glass fill level. The essential disadvantage of this device and this method lies in the coupling of the total throughput and the linear throughput.

The known methods with a slit nozzle and draw bar cannot achieve the excellent surface qualities that can be achieved with the known drawing methods without the slit nozzle. Particularly at high linear throughputs and high processing temperatures, the dwell times of the glass film on the draw bar are not sufficient to heal the waviness of the surface, which is caused by the wetting of the nozzle in the vicinity of the breaking edge.

In the known methods with the slit nozzle and without a draw bar, the adjustments to the total throughput and the adjustment of the linear throughput (thickness distribution lateral to the drawing direction) are coupled to each other.

In format or throughput changes, the nozzle geometry and the temperature control in the vicinity of the nozzle must be constantly renewed in order to be able to make adjustments in a generally empirical fashion. The starting processes last a long time and the desired flexibility of production is only achieved to a limited degree.

In order to adjust the specified thickness distribution, defined temperature profiles must be set lateral to the drawing direction in the vicinity of the nozzle. The temperature profiles imparted to the glass ribbon can only be partially balanced up to the fine annealing zone. This can lead to an impermissible deformation of the glass ribbon (warp) during the cooling to room temperature.

SUMMARY OF THE INVENTION

The object of the invention is to provide a method that can be used among other things to process glasses with a more pronounced tendency to crystallize or to form glass ceramics, wherein the quality of the thin glass panes is improved and the productivity is increased. Another object of the invention is to provide a device for carrying out this method.

This object is attained with a method of producing thin glass panes, in particular glass panes with a thickness of less than 1 mm, by drawing a thin glass ribbon vertically downward. This method comprises the steps of:

a) conveying a glass melt from a tank furnace, through a vertical inlet and to a drawing tank with a nozzle system, which has at least one slit nozzle;

b) setting a total throughput by means of a length and cross section of the vertical inlet, by definite heating and cooling of the vertical inlet, and by means of glass melt viscosity in the vertical inlet so that a pressure of the glass melt in the vertical inlet, which is due to a level difference between a free surface height of the glass melt and a nozzle system height, significantly decreases; and c) setting a throughput per unit of length in a direction lateral to the glass ribbon by means of nozzle system geometry, by definite heating and cooling of segments of the drawing tank and the at least one slit nozzle, by means of glass melt viscosity in the nozzle system, so that, upon emerging from the nozzle system, glass does not wet an underside of the at least one slit nozzle in the vicinity of a breaking edge.

The method according to the invention fulfills the above-described requirements with regard to product quality and economy.

The method combines the advantages of the drawing method with a nozzle and the advantages of the drawing method without a nozzle. This means that glass thicknesses of 20 µm to 3000 µm can be adjusted, with a good thickness distribution in the lateral direction and in the drawing direction, with thickness fluctuations of <20 µm and a small border width. Moreover, an excellent surface quality is achieved, i.e. with a waviness of less than 20 nm. In addition, the warp is extremely slight. High processing temperatures and low processing viscosities ($5 \times 10^3$ to $3 \times 10^4$ dPas) are also possible for the production of glasses or glass ceramics that are susceptible to crystallization. In addition, a large degree of flexibility with regard to formats is possible, whose widths can be adjusted between 300 mm and 2000 mm. Furthermore, high linear throughputs (mass of glass per ribbon width per unit time>5 g/(mm×min) can be achieved with a high degree of process stability. By contrast, this largely avoids the disadvantages of the drawing method with and without nozzles.

The inlet, the drawing tank, and the nozzle system preferably constitute a closed system. The total throughput is set by means of the length arid cross section of the inlet and by means of the viscosity of the glass melt disposed in the inlet. On the other hand, the throughput per unit of length in a direction lateral to the glass ribbon (linear throughput) is set to the definite thickness setting by means of the geometry of the nozzle system as well as by means of the viscosity of the glass melt along the nozzle. The pressure of the glass melt, which is generated by the level difference between the height of the free surface of the glass melt and the height of the nozzle system, is reduced by the steps taken according to the invention, essentially in the inlet. The pressure drop in the vicinity of the nozzle system is low so that the glass melt widens only to an insignificant degree upon emerging from the slit nozzle. The wetting of the nozzle in the vicinity of the breaking edge achieves improved surface qualities in comparison to the known drawing methods.

According to the invention, the adjusting of the total throughput is largely decoupled from the adjusting of the linear throughput. The total throughput is adjusted through the definite heating and cooling of the inlet. The linear throughput and therefore the thickness distribution lateral to the ribbon direction, is adjusted through the definite heating and cooling of drawing tank segments, the slit nozzle, and the draw bar. This means that changes in the pressure drop in the vicinity of the drawing tank and the nozzles e.g. caused by temperature changes in the region, have only an insignificant influence on the total throughput. This increases the stability of the total throughput and therefore the stability of the thickness distribution of the glass ribbon in the Z-direction (see the coordinate system in FIG. 1). The decoupling of the different process steps simplifies the process control. The times for initiation processes are reduced and the flexibility of production, e.g. changes to the total throughput or changes to the glass ribbon thickness, are increased in comparison to the known drawing methods due to the broadening of the process window. The equipment does not have to be adapted to the changed geometries of the glass ribbon or to changed process parameters.

The following temperature ranges for the inlet (ZL), drawing tank (ZT), and slit nozzle (SD) have turned out to be advantageous for an alkali-free borosilicate glass with Tg of approx. 700° C., a density of approx. 2.5 g/cm³, and a thermal expansion of approx. $37 \times 10^{-7}$/K:

$$T_{ZL1}=Tg+670 \text{ K to } T_{ZL2}=Tg+590 \text{ K}$$

$$T_{ZT1}=Tg+590 \text{ K to } T_{ZT2}=Tg+570 \text{ K}$$

$$T_{SD}=Tg+570 \text{ K to } Tg+550 \text{ K},$$

Tg here stands for the glass transition temperature.

Although the method also furnishes good results with regard to the surface quality even without a draw bar, a further improvement can be achieved through the use of a draw bar. The draw bar splits the glass melt flow as it passes through the slit nozzle. The glass melt flows downward on both sides of the draw bar. The two glass films melt back together again to form one glass ribbon at the bottom end of the draw bar.

Preferably, the dwell time and the viscosity of the glass films on the draw bar are adjusted in such a way that the deviations from the ideal surface contour heal almost completely. In order to achieve this, the glass films are preferably selectively heated and/or cooled on the draw bar.

Due to the long dwell time of the two glass films on the draw bar while the viscosity of the glass is low, deviations from the ideal surface contour due to surface tensions heal almost completely. A surface quality is achieved, which is comparable to the surface quality of the drawing method without the nozzle (waviness<20 mm).

In this connection, preferably the following temperature is set in the draw bar (LK):

$$T_{LK}=Tg+560 \text{ K to } Tg+540 \text{ K}.$$

This corresponds to a glass viscosity of $1 \times 10^4$ dPas.

The slit width between the slit nozzle and the draw bar can, for example, be 10 mm. The thickness of the two glass films is 8 mm, for example. This means that the two glass films do not wet the slit nozzle from underneath.

The quality demands on the geometry of the breaking edge of the slit nozzle are low in comparison to the known drawing methods with nozzles. Therefore in contrast to the known drawing methods, the nozzles can be used several times, even after stopping. Manufacturing costs are consequently reduced.

Due to the stabilization of the glass films by means of the draw bar and the rapid cooling after the fusing of the two glass films in the onion, the processing temperatures can be selected as significantly higher (>/=100 K) than in the drawing methods that use a nozzle without a draw bar, and are thus comparable to the processing temperatures in the drawing methods without a nozzle. The increase in the processing temperatures permits the production of special glasses with pronounced crystallizing tendencies or of glass ceramics.

The glass ribbon is preferably cooled selectively in the vicinity of the onion.

Due to the stabilization of the glass films by means of the draw bar and the rapid cooling of the glass in the vicinity of the onion, the glass mass is low in the vicinity of the onion. As a result, linear throughputs of up to 5 g/(mm×min) can be set with a high degree of process stability. At the above-indicated temperature settings, for example linear throughputs of 3.5 g/(mm×min) are achieved. This decisively improves the productivity.

The temperature deviation $\Delta T_{SD}$ of the glass melt along the slit nozzle is preferably set to $\Delta T_{SD}</=20$ K. By contrast with the known drawing method with a nozzle, the temperature in the vicinity of the nozzle is distinctly more homogeneous. The shrinkage rate of the glass ribbon is consequently more homogenous during the cooling process in the drawing direction lateral to the glass ribbon than in the previously known drawing methods with a nozzle. The deformation of the glass ribbon (warp) during the cooling to room temperature is thus distinctly reduced. As a result, thin glass panes can be produced that meet high quality demands with regard to flatness.

Preferably the glass films are laterally guided along their side edges. Through the side limiter of the draw bar and the temperature guidance in the vicinity of the cooling systems of the nozzle furnace, the process can be guided so that the width of the borders and consequently the glass losses are adequately small. It is thus possible to eliminate a non-homogeneous temperature control in the nozzle region and on the border rollers in order to set the desired width. Improving the yield increases the productivity.

In the nozzle furnace, the main cooler cools the glass in the vicinity of the onion to a temperature of for example approx. Tg+290 K.

Slight irregularities in the linear throughput can lead to slight thickness fluctuations lateral to the drawing direction of the glass ribbon. According to the invention, the thickness distribution can be corrected by means of the cooling system of the nozzle furnace underneath the main cooler, which cooling system is segmented in the X-direction. To that end, different zones of the glass ribbon can be cooled slightly differently as needed so that the stretching of the glass ribbon in the Z-direction is greater for hotter glass zones than it is for cooler glass zones. Therefore in the stretching of the glass ribbon, the reduction in the thickness of the cooler zones is moderately reduced in comparison to the reduction in the thickness of the warmer zones. In nozzle furnaces, the segmented heating and cooling elements can consequently be used to set definite temperature profiles in the ribbon direction and lateral to the ribbon direction. This consequently improves the results with regard to the quality criterion of thickness distribution.

With regard to the device, when in the viscoelastic state, the glass ribbon is stretched as needed lateral to the ribbon direction by means of rollers underneath the nozzle furnace so that the glass ribbon is conveyed flat and without tension to the heat sinks disposed in the drawing shaft. This permits the correction of possible deviations from flatness caused in the hot formation region. In addition, the cylinders or rollers prevent the deformation in the elastic region from having an effect on the hot forming region. The cylinders or rollers are disposed in a rolling furnace or in the drawing shaft in which segmented heating and cooling elements can be used to set definite temperature profiles in the ribbon direction lateral to the ribbon direction. This improves the results with regard to the quality criterion of warp.

According to the invention, the glass ribbon is drawn vertically downward with drawing rollers underneath the nozzle furnace. The drawing rollers draw the glass ribbon at a speed of e.g. 1.6 m/min so that with a linear throughput of 3.5 g/(min×mm) and a gross range of approx. 800 mm, a glass ribbon with a thickness in the net range of 0.7 mm is produced. Preferably, the thickness of the glass ribbon is continuously measured, wherein the drawing speed is controlled by means of the measured thickness values.

The drawing speed can optionally be regulated as a function of the on-line thickness measurement executed after the cooling of the glass. This improves the results with regard to the quality criterion of average thickness.

With large ribbon thicknesses, i.e. a heavy ribbon weight and a light drawing force, if the drawing forces needed to set the required thickness are lighter than the ribbon weight, then the drawing rollers can compensate for a part of the ribbon weight. They must then preferably be disposed in the rolling furnace or in the drawing shaft.

According to another embodiment, the glass ribbon is selectively heated and/or cooled in the rolling furnace and/or in the drawing shaft, both in the ribbon direction and lateral to the ribbon direction.

In the first rapid cooling zone, the glass ribbon is preferably cooled to Tg+50° K, then in the fine annealing zone it is annealed to for example Tg−50 K in order to adjust the heat sink tension, and in the rapid cooling zone, is rapidly cooled for example to 450 K.

Preferable uses of the glass panes produced according to this method include substrate glasses in electronic devices, e.g. displays (portable telephones, flat screens, etc.) or substrate glasses for mass storage devices of computers.

Accordingly the device of the present invention for producing thin glass panes, in particular glass panes with a thickness of less than 1 mm, comprises a tank furnace, a homogenization system, an inlet and a drawing tank, wherein the drawing tank has a nozzle system, which has at least one slit nozzle.

In this instance, the inlet, the drawing tank, and the nozzle system constitute a closed system. The inlet can be comprised of a platinum alloy or of a fireproof material and can have segmented, directly or indirectly heated or cooled tube sections. The tube or tube system has a length of 2 m to 5 m and a round cross section with a diameter of between 50 mm and 80 mm.

The tube is preferably situated vertically.

The required viscosity curve of the glass is set in the tube through a combination of heating and cooling. At the end of the inlet, the glass is fed into the drawing tank.

In the drawing tank, the glass melt is uniformly distributed lateral to the drawing direction. The drawing tank is a receptacle preferably made of a platinum alloy in which the required viscosity curve of the glass is set through a combination of heating and cooling. The glass is supplied to the nozzle system underneath the drawing tank.

The nozzle system preferably has one or two slit nozzles and possibly a draw bar made of a platinum alloy. The slit nozzles preferably have a heating unit. The draw bar can be a platinum alloy plate that tapers off to a point toward the bottom and preferably has a heating unit and if need be a cooling unit. The setting of the homogeneous linear throughput is executed through the definite heating and cooling of the drawing tank, the slit nozzle, and the draw bar.

The draw bar is situated vertically in the slit nozzle and preferably protrudes into the drawing tank through the slit of the slit nozzle. The draw bar splits the glass flow in the Y-direction while it is still in the drawing tank (see the coordinate system in FIG. 1). Equal glass film thicknesses are assured by means of this and also by means of an external adjusting system with which the draw bar can be adjusted in the X-Y-direction and possibly also in the Z-direction in relation to the position of the nozzle slit. It is necessary for the glass film to be as equal as possible in thickness in order to assure low warp values.

In addition, the straightness of the draw bar, in particular for large ribbon widths and long processing times, can be assured through exertion of a tensile force in the X-direction. As a result, large ribbon widths with long manufacturing duration can be produced, which once again improves the productivity decisively.

The nozzle furnace is connected beneath the slit nozzle. The draw bar preferably protrudes into the nozzle furnace. The nozzle furnace preferably has a heating device and two cooling systems.

The draw bar can be directly heated and cooled in order to definitely set the dwell time of the glass film on the draw bar. To this end, the draw bar preferably has a heating device and/or a cooling device. In addition, the glass films can be heated on both sides by the segmented heating device of the nozzle furnace.

The nozzle furnace preferably has radiation plates on opposite sides in the vicinity of the draw bar.

According to another embodiment, the nozzle furnace has at least one dividing wall that can be moved into the furnace shaft underneath the radiation plates.

Through the provision of a small onion, heat is drawn from the glass directly underneath the draw bar by means of two cooling systems, a main cooling unit and a segmented cooling unit underneath the main cooling unit. The main cooling unit dissipates the main portion of the heat quantity. The cooling unit that is finely segmented in the X-direction assures the correction of slight thickness fluctuations caused by the nozzle system.

The glass ribbon is stretched vertically downward, and possibly also lateral to the ribbon direction. The drawing rollers and warp rollers required for this are situated underneath the nozzle furnace, possibly in the rolling furnace, in the drawing shaft, or in the drawing machine.

The drawing rollers are used to adjust the thickness. The warp rollers assure the required flatness of the glass ribbon and of the later glass panes.

During the starting process, the glass ribbon is preferably drawn in by means of drawing rollers underneath the nozzle furnace. This significantly reduces the duration of the starting phase.

In order to facilitate the starting process, the nozzle furnace can be opened lateral to the ribbon direction. This facilitates the starting process.

The rolling furnace can also be opened lateral to the ribbon direction in order to facilitate the starting process.

In order to facilitate the starting process, the drawing shaft can be telescoped downward or to the side. During production, the drawing shaft is docked against the rolling furnace from underneath. This also facilitates the starting process.

BRIEF DESCRIPTION OF THE DRAWING

Exemplary embodiments of the invention will be explained in detail below in conjunction with the drawings.

DESCRIPTION OF THE PREFERRED EMBODIMENTS

Figure 1:
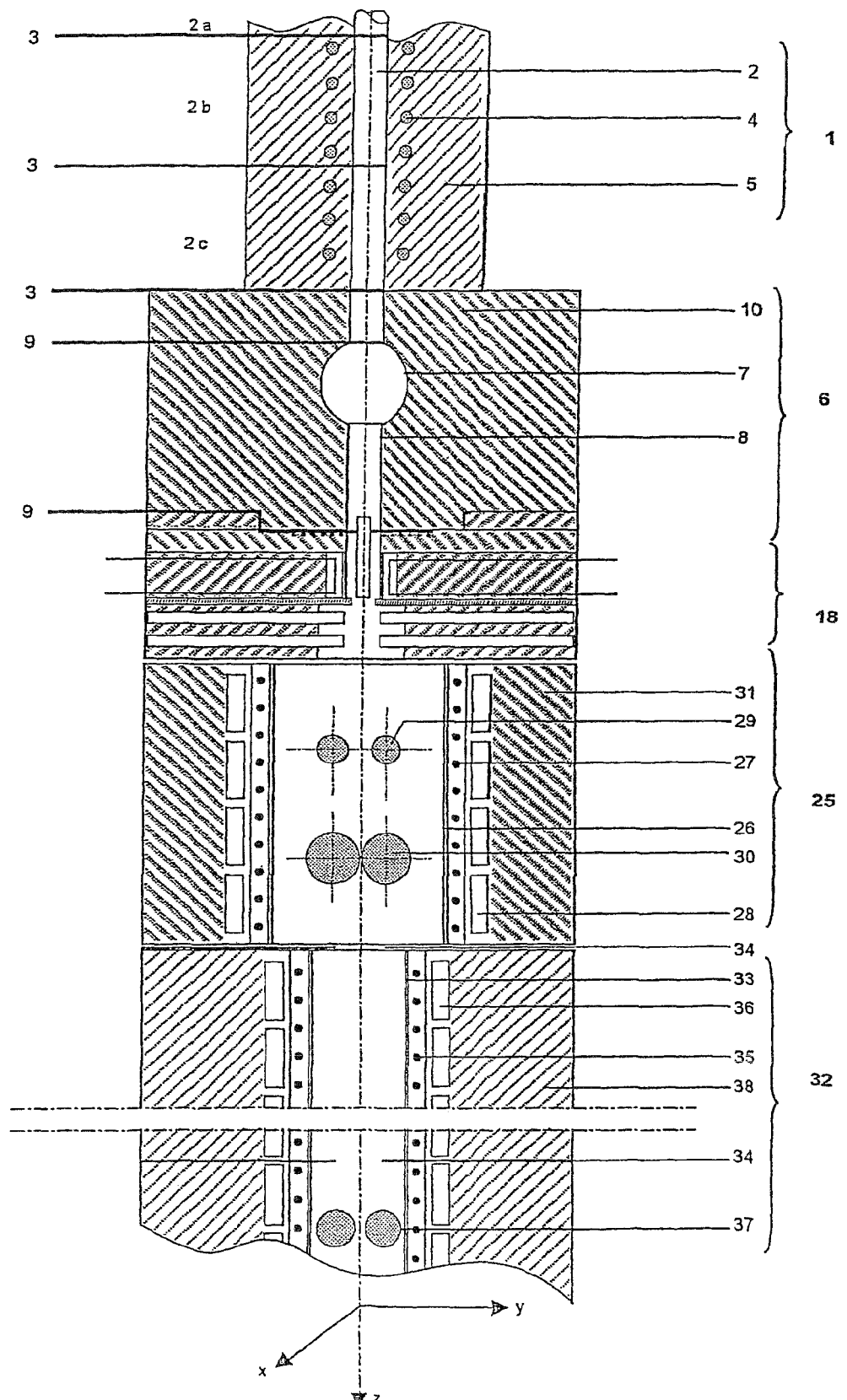
FIG. 1 shows a vertical section through the device.
Figure 2:
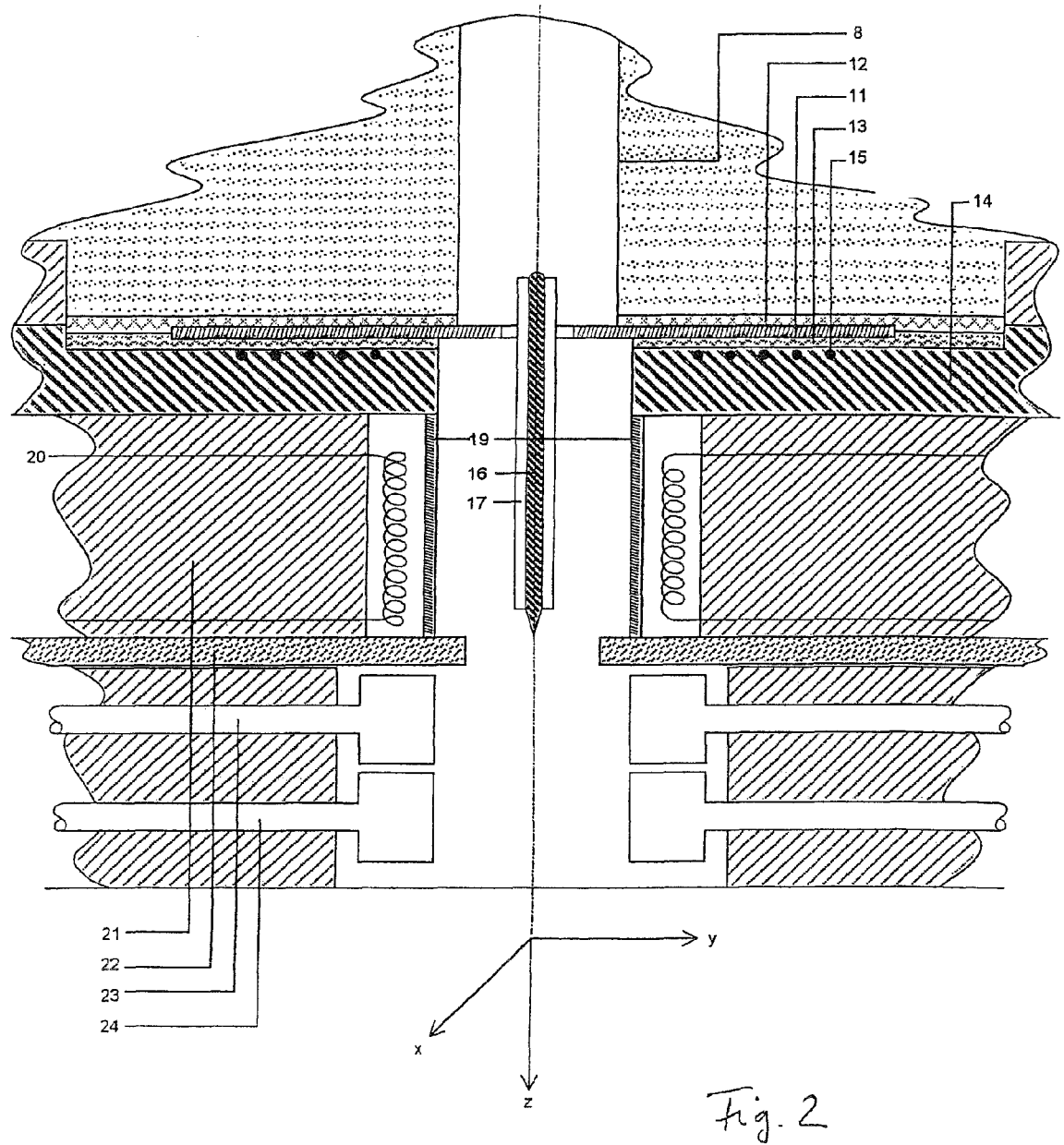
FIG. 2 shows an enlarged vertical section through the region of the slit nozzle.

FIGS. 1 and 2 have a coordinate system sketched into them to establish the directions in space. The X-direction here indicates direction of the glass ribbon width, the Y-direction is the direction perpendicular to the ideal ribbon surface (glass ribbon thickness), and the Z-direction is the direction in the drawing direction.

FIG. 1 shows a vertical section through the device, including the schematically depicted sections of the inlet 1, drawing tank 6, nozzle furnace 18, rolling furnace 25, and the drawing shaft 32.

The glass melt is fed from a homogenization system that is not shown, through the inlet 1, and into the drawing tank 6. The inlet 1 is comprised of a tube 2 disposed in the vertical direction. The tube 2 is comprised of a platinum alloy or a fireproof material, which is segmented and has symmetrical tube sections 2a, b, c that are directly or indirectly heated or cooled. In accordance with the tube sections 2a, b, c, a correspondingly segmented heating device 3 and a segmented cooling device 4 are provided, which are shielded from the outside by means of insulation 5. The heating device 3 is embodied by a direct or indirect electric heating unit. The cooling device 4 is comprised of cooling tubes through which a cooling medium is conveyed. The cooling tubes encompass the segments of the tube 2 and are connected to corresponding cooling units.

The drawing tank 6 that adjoins the inlet channel 1 from underneath has a glass distributor 7 made of a platinum alloys which transitions vertically into the glass inlet 8 toward the bottom, which is also made of a platinum alloy. The glass distributor 7 is used to distribute the glass melt over the entire length of the slit nozzle 11, which will be described in further detail below. The drawing tank 6 has a heating system 9, which is likewise segmented in the vertical direction and in the lateral direction. The heating unit can be embodied as either a direct or indirect electric heating unit. On the outside, the drawing tank 6 is enclosed by an insulation 10.

Underneath the drawing tank 6 is the nozzle system with the slit nozzle 11, the seals 12 and 13, and the draw bar 16. The slit nozzle and the draw bar are made of a platinum alloy. The nozzle holder 14 presses the slit nozzle 11 against the drawing tank 6 from underneath. The seal 12 and the flexible seal 13 assure the frictional and positive engagement.

The slit nozzle 11 is electrically heated directly or indirectly by means of the heating unit 15 disposed in the nozzle holder 14. In order to optimize the glass flow, another slit nozzle made of a platinum alloy (not shown) can, if needed, be disposed above the slit nozzle 11.

As shown in FIG. 2, the slit nozzle 11 has a draw bar 16 made of a platinum alloy disposed in it, which is comprised of a plate-shaped element that tapers down to a point at its lower end. The draw bar 16 can have a side limiter 17 and is disposed so that it can be adjusted in the X-, Y-, and Z-direction, which is not shown in FIGS. 1 and 2. The draw bar 16 also has a direct electrical heating unit, and possibly also has a cooling unit.

The two glass films, which flow vertically downward out of the slit nozzle 11 on the outsides of the draw bar 16, come together to form a common glass ribbon at the lower end that tapers down to a point. The glass films on the draw bar, the onion, and the stretching region of the glass ribbon are disposed between the radiation plates 19 of the nozzle furnace 18, which has an electric heating unit 20 in the upper part and has cooling systems 23 and 24 in the lower part. The radiation plates 19 shield the heating unit from the glass ribbon in order to improve the temperature homogeneity.

A dividing wall 22 that can move in the Y-direction and disposed at the same height as the onion can be used to regulate the amount of heat that the cooling systems 23, 24 withdraw from the glass ribbon. Below the dividing wall 22 is the main cooling unit 23 for adjusting the temperature of the glass ribbon in the vicinity of the onion. The cooling system 24 that is segmented in the X-direction is used to adjust the thickness distribution in the lateral direction of the glass ribbon. The nozzle furnace 18 is insulated in relation to the outside by means of the insulation 21. In order to facilitate the starting process, the nozzle furnace can be opened in the Y-direction if need be.

Underneath the nozzle furnace 18 is the rolling furnace 25 with the rolling shaft 26. The rolling furnace 25 has an electric heating unit 27 that is segmented in the X- and Y-direction and a cooling unit 28 that is also segmented in the X- and Y-direction. In order to improve the temperature homogeneity, the rolling shaft 26 shields the heating unit from the glass ribbon. The warp rollers 29 are disposed in the rolling furnace 25 and, by means of their inclined position or a special profiling, stretch the glass ribbon in the X-direction in order to set the required flatness. The rolling furnace 25 also contains one or more drawing roller pairs 30, which stretch the ribbon in a definite fashion in the Z-direction in order to set the required thickness. The rolling furnace 25 is insulated in relation to the outside by means of the insulation 31. In order to facilitate the starting process, the rolling furnace 25 can be opened in the Y-direction, if need be.

Underneath the rolling furnace 25 is the drawing shaft 32. The drawing shaft 32 has an electric heating unit 35 that is segmented in the X- and Y-direction, and has a cooling unit 36 that is also segmented in the X- and Y-direction. In order to improve the temperature homogeneity, the radiation shaft 33 shields the heating unit 35 from the glass ribbon. In order to prevent indefinite convection, movable dividing walls 34 are provided in the radiation shaft. The drawing shaft 32 can contain stabilization rollers 37, which stabilize the position of the glass ribbon in the Y-direction. The drawing shaft 32 is insulated in relation to the outside (insulation 38).

In order to facilitate the starting process, drawing shaft 32 can be opened in the Y-direction if need be or doors disposed at the end can be opened. In addition, the drawing shaft 32 can be telescoped downward in order to facilitate setup activities. For production, the drawing shaft 32 is docked from underneath against the rolling furnace 25.

The rolling furnace 25 can also be omitted. If the rolling furnace is not provided, then the warp rollers 29 or the drawing rollers 30 can be contained in the drawing shaft 32. With low wall thicknesses, i.e. with a light ribbon weight, and with light drawing forces, in short drawing shafts 32, it is possible to eliminate the drawing rollers 30 and the stabilizing rollers 37 in the drawing shaft. The drawing rollers 30 are then disposed underneath the drawing shaft 32.

All heating systems are operated electrically. The cooling systems are cooled by means of circulating fluids or gaseous mediums.

An example is given below for the production of substrate glass for TFT displays.

Glass:

Alkali-free borosilicate glass with Tg>700° C., density<2.5 g/cm$^3$, and thermal expansion<37×10$^{-7}$/K Quality Criteria with Regard to Geometry:

| length: | 670 mm |
| --- | --- |
| width: | 590 mm |
| thickness: | 0.7 mm |
| thickness distribution: | <0.025 mm |
| warp: | <0.5 mm |
| waviness: | <50 nm |

Process Management:

Inlet:

The glass temperatures in the inlet are set to between Tg+670 K and Tg+590 K (falling monotonically along the inlet). The total throughput is then 2.8 kg/min.

Drawing tank, nozzle system, and heating of the nozzle furnace: The glass temperatures in the drawing tank 6 are set to between Tg+590 K and Tg+570 K, the glass temperatures in the slit nozzle 11 are set to between Tg+570 K and Tg+550 K, and the glass temperatures at the draw bar 16 are set to between 1-g+560 K and Tg+540 K. This yields a homogeneous linear throughput lateral to the glass ribbon of 3.5 g/(min×mm). The glass films on the draw bar 16 are each 8 mm thick. With a slit width (distance between the slit nozzle 11 and the draw bar 16) of 10 mm each, the glass films on the draw bar 16 consequently do not wet the underside of the slit nozzle 11.

Cooling, Nozzle Furnace, and Rolling Furnace:

The main cooling unit 23 (cooling medium: water) cools the glass in the vicinity of the onion to approximately Tg+290 K. The glass is stretched by the drawing rollers 30 of the rolling furnace 25 at a drawing speed of 1.6 m/min, producing a glass ribbon with a gross width of 800 mm and a thickness of 0.7 mm. The segmented cooling unit 23, 24 (cooling medium: water/air) is set so as to reliably achieve the required thickness distribution. The segmented heating and cooling of the rolling furnace 25 homogeneously cool the glass ribbon to Tg+140 K.

Drawing Shaft:

With the segmented heating and cooling of the drawing shaft 32, the glass ribbon is cooled to Tg+50 K in the first rapid cooling zone, and then in the fine annealing zone, the glass ribbon is fine annealed to Tg−50 K in order to set the permanent heat sink tensions, and then in the second rapid cooling zone B, the glass ribbon is rapidly cooled to 450 K. In the drawing shaft 32 and underneath the drawing shaft, additional rollers are provided, which stabilize the position of the glass ribbon in and under the drawing shaft 32. After the fast quenching and cutting to length, the requirements are met regarding warp.

REFERENCE NUMERALS

| Reference Numerals | |
| --- | --- |
| 1 | inlet |
| 2 | tube |
| 2a,b,c | tube section |
| 3 | heatfng unit |
| 4 | cooling unit |
| 5 | insulation |
| 6 | drawing tank |
| 7 | glass distributor |
| 8 | glass inlet |
| 9 | heating system |
| 10 | insulation |
| 11 | slit nozzle |
| 12 | seal |
| 13 | flexible seal |
| 14 | nozzle holder |
| 15 | heating unit |
| 16 | draw bar |
| 17 | side limiter |
| 18 | nozzle furnace |
| 19 | radiation plates |
| 20 | heating unit |
| 21 | insulation |
| 22 | dividing wall |
| 23 | main cooling unit |
| 24 | segmented cooling system |
| 25 | rolling furnace |
| 26 | rolling shaft |
| 27 | heating unit |
| 28 | cooling unit |
| 29 | warp rollers |
| 30 | drawing rollers |
| 31 | insulation |
| 32 | drawing shaft |
| 33 | radiation shaft |
| 34 | dividing wall |
| 35 | heating unit |
| 36 | cooling unit |
| 37 | stabilizing rollers |
| 38 | insulation |

The invention claimed is:

1. A method of producing thin glass panes, in particular glass panes with a thickness of less than 1 mm, said method comprising the steps of:
  a) conveying a glass melt from a tank furnace, through a vertical inlet and to a drawing tank with a nozzle system, said nozzle system having at least one slit nozzle;
  b) drawing a glass ribbon vertically downward from the at least one slit nozzle;
  c) setting a total throughput by setting a length and cross section of the vertical inlet and by definite heating and cooling of the vertical inlet so as to control glass melt viscosity in the vertical inlet in such a way that a pressure of the glass melt in the vertical inlet, said pressure being due to a level difference between a free surface height of the glass melt and a nozzle system height, significantly decreases; and
  d) setting a throughput per unit of length in a lateral direction along the glass ribbon by setting nozzle system geometry and by definite heating and cooling of segments of the drawing tank and the at least one slit nozzle so as to control glass melt viscosity in the nozzle system, so that upon emerging from the nozzle system, glass does not wet an underside of the at least one slit nozzle in the vicinity of a breaking edge;

wherein the setting of the total throughput and the setting of the throughput per unit of length are largely decoupled from each other so that process control is simplified.

2. The method as defined in claim 1, wherein the glass melt in the vertical inlet has temperatures between an upper temperature ($T_{ZL1}$) equal to Tg+670 K and a lower temperature ($T_{ZL2}$ equal to Tg+590 K.

3. The method as defined in claim 1, wherein the glass melt in the drawing tank has temperatures between an upper temperature ($T_{ZT1}$) equal to Tg+590 K and a lower temperature ($T_{ZT2}$) equal to Tg+570 K.

4. The method as defined in claim 1, wherein the glass melt in the at least one slit nozzle has temperatures ($T_{SD1}$) between an upper temperature equal to Tg+570 K and a lower temperature equal to Tg+550K.

5. The method as defined in claim 1, wherein a temperature deviation ($\Delta T_{SD}$) of the glass melt along the at least one slit nozzle is less than or equal to 20 K.

6. The method as defined in claim 1, further comprising splitting the flow of said glass melt by at least one draw bar, after said glass melt passes through the at least one slit nozzle, and wherein the glass melt travels downward in the form of respective glass films on both sides of the at least one draw bar and comes together to form said glass ribbon at a bottom end of the at least one draw bar.

7. The method as defined in claim 6, further comprising adjusting a dwell time and viscosity of the glass films on the at least one draw bar, so that deviations from an ideal surface contour heal almost completely.

8. The method as defined in claim 6, wherein the glass films are laterally guided along side edges of said glass films.

9. The method as defined in claims 6, wherein the glass ribbon is selectively cooled in the vicinity of an onion thereof.

10. The method as defined in claim 1, wherein the glass films are selectively heated and/or cooled on the at least one draw bar.

11. The method as defined in claim 1, wherein at least a part of a weight of the glass ribbon is compensated for during drawing.

12. The method as defined in claim 1, further comprising continuously measuring a thickness of said glass ribbon and controlling a drawing speed during the drawing according to measured thickness values for said glass ribbon.

13. The method as defined in claim 1, further comprising stretching said glass ribbon in a direction lateral to said glass ribbon in a visco-elastic region of said glass ribbon.

14. The method as defined in claim 1, further comprising selectively heating and/or cooling said glass ribbon both in a direction along said glass ribbon and in another direction lateral to the glass ribbon, in a rolling furnace and/or in a drawing shaft.

15. A device for producing thin glass panes, in particular glass panes with a thickness of less than 1 mm, said device comprising a tank furnace, a homogenization system, an inlet, a drawing tank, and a nozzle system, said nozzle system having at least one slit nozzle; and wherein the inlet (1) has a vertical tube (2) with segmented tube sections (2a, b, c), the vertical tube (2) has a circular cross section, a length of 2 to 5 m, and a tube diameter of 50 mm to 80 mm, the inlet (1) has a segmented heating and cooling unit (3, 4), and the drawing tank (6) has a heating system (9) segmented in a vertical direction and a lateral direction so that a pressure of a glass melt in said inlet, which is produced by a level difference between a height of a free surface of the glass melt and a height to the nozzle system, is reduced sufficiently so that the glass melt does not wet the underside of the at least one slit nozzle in the vicinity of a breaking edge.

16. The device as defined in claim 15, wherein the at least one slit nozzle (11) has a heating unit (15).

17. The device as defined in claim 15, wherein the at least one slit nozzle (11) contains at least one vertical draw bar (16).

18. The device as defined in claim 17, wherein said at least one vertical draw bar (16) has side limiters (17).

19. The device as defined in claim 17, further comprising means for adjusting a position of said at least one vertical draw bar (16) in an X-direction, a Y-direction and a Z-direction.

20. The device as defined in claim 17, wherein said at least one vertical draw bar (16) is stretched in an X-direction by applying a tensile force.

21. The device as defined in claim 17, wherein said at least one vertical draw bar (16) has a heating unit and/or a cooling unit.

22. The device as defined in claim 15, wherein the at least one slit nozzle (11) contains a draw bar (16), the draw bar (16) is a plate that tapers down to a point at a bottom of the draw bar and said plate is made of a platinum alloy.

23. The device as defined in claim 15, wherein the at least one slit nozzle (11) contains a draw bar (16) and the draw bar (16) protrudes upward beyond the at least one slit nozzle (11).

24. The device as defined in claim 15, further comprising a nozzle furnace (18) adjoined on an underside by the at least one slit nozzle (11) and wherein said nozzle furnace (18) has a segmented heating and cooling device (20, 23, 24).

25. The device as defined in claim 24, wherein the at least one slit nozzle (11) contains a draw bar (16) and the nozzle furnace (18) has radiation plates (19) on surfaces opposite the draw bar (16).

26. The device as defined in claim 25, wherein the nozzle furnace (18) has at least one movable dividing wall (22) underneath the radiation plates (19).

27. The device as defined in claim 24, wherein the nozzle furnace (18) has means for opening laterally to a direction along a glass ribbon.

28. The device as defined in claim 24, further comprising a rolling furnace (25) with a rolling shaft (26) arranged underneath the nozzle furnace (18), and said rolling furnace (25) has a heating and cooling unit (27, 28) that is segmented in an X-direction and a Y-direction.

29. The device as defined in claim 28, wherein said rolling shaft (41) contains at least one warp roller pair (29) and/or drawing roller pair (30).

30. The device as defined in claim 29, further comprising means for regulating a drawing speed of the drawing roller pair (30) according to an on-line measured thickness of a glass ribbon formed therein.

31. The device as defined in claim 28, wherein said rolling furnace (25) has means for opening laterally along a direction of a glass ribbon formed therein.

32. The device as defined in claim 28, further comprising a drawing shaft (32) arranged underneath said rolling furnace (25) and wherein said drawing shaft (32) can be telescoped out and in, downward or laterally.

* * * * *